United States Patent Office

3,129,455
Patented Apr. 21, 1964

3,129,455
MEAT PRODUCT
Louis J. Huber, Minneapolis, Minn., assignor to General Mills, Inc., a corporation of Delaware
No Drawing. Filed Oct. 26, 1961, Ser. No. 147,746
2 Claims. (Cl. 17—45)

This invention relates to a novel process for deboning meat.

In preparing many foods containing meat or made up of meat, it is desirable to remove all bones therefrom. For some meats, the deboning process is not difficult because the meat contains only a few bones of relatively large size. Deboning other meats, however, is not so simple. Examples of meats which are difficult to debone include chicken, and other fowl, particularly the wings and necks thereof, small game, and some parts of larger animals, such as ox tails.

Heretofore, deboning of such meats has been extremely expensive and ineffective. One method has been to cook the meat and hand trim the meat. This process is uneconomical for many meats, such as chicken necks. Another method which has been employed is to cook the meat for an extremely long time, indeed, in some cases for many hours, thereby obtaining a complete release of the meat from the bones. Both of the above procedures generally produce meat which is of poor quality, because if the meat is to be canned, it must be re-cooked in the can. The product is typically stringy, off-color, and not particularly appetizing.

It is an object of this invention to provide a simple, economic method of deboning meat. Other objects will appear hereinafter.

The objects of this invention are accomplished by the process which comprises subjecting bone-containing meat to elevated temperatures and pressures and suddenly releasing said pressure, thereby substantially separating said meat from said bones.

Similar processes, when applied to cereals, are commonly referred to as "puffing." Unlike these processes, however, an expanded product is not obtained. The product of this invention has the appearance of partially cooked meat. Upon canning and cooking the product, there is obtained a pleasant-looking, appetizing and palatable food.

Generally, the prior art cereal puffing techniques are useful in the deboning process of the present invention. The process can be carried out using steam or other inert gases as the puffing gas. Similarly, the material can be expanded into a vacuum or into atmospheric pressure. Generally, it is preferred to employ steam and expand into atmospheric pressure. Pressures which have been found particularly useful are 50 to 150 p.s.i. If steam is used in the puffing operation, or formed in the operation, the temperatures in the puffing apparatus vary more or less with the pressure employed. Temperatures of 300 to 450° F. have been found to give good results for most meats. At very low temperatures and pressures, insufficient deboning may take place. At extremely high temperatures and pressures, some bones tend to shatter. The optimum pressure and operable pressure range varies considerably from meat to meat and with the age and portion of the animal deboned, and is therefore, best determined by trial.

The time at the elevated temperature is not critical and can be varied considerably. Short times of 10 seconds to 5 minutes are preferred since in many cases as little cooking as possible is desired. On the other hand, if a more fully cooked product is desired, cooking times of 5 to 10 minutes are advantageously employed. Where a fully cooked product is desired, high steam pressures are advantageously employed for the cooking operation. However, the pressure is preferably reduced, just prior to the sudden pressure release which causes the deboning.

One completely unexpected advantage of the present deboning process is that it may be used to uniformly flavor, color, or season the meat at the time that it is deboned. In order to attain this advantage, it is only necessary to add the desired flavor, color or seasoning to the meat before it is subjected to the deboning process. During the deboning process, the flavor, color, or seasoning is impregnated through all portions of the meat, obtaining unusually thorough distribution thereof.

The process of the present invention is applicable to deboning meats of all sizes. Generally, the size of the meat being deboned is limited by the size of the puffing apparatus. Thus, the process is useful for deboning an entire eviscerated animal or portions thereof. Further, when terms such as fowl, chicken, turkey, etc., are used in this description and the appended claims, it will be understood that the term applies to whole animals as well as portions thereof. Generally, it is advantageous to employ somewhat longer times at the elevated temperature and pressure when larger pieces are deboned.

In order to further illustrate various features of the present invention and preferred embodiments thereof the following examples are included. Unless otherwise indicated, all parts and percentages used herein are by weight.

*Example I*

Chicken wings were loaded into a puffing gun and charged with steam at 100 p.s.i.g. After a period of 15 seconds, the pressure was released and the contents recovered. The meat was completely separated from the bones. The bones were easily lifted out. The pure-meat product was a partially cooked, firm meat which was undamaged by the deboning process.

*Example II*

Chicken wings were loaded into a puffing gun and charged with 80 p.s.i.g. steam. After a period of 90 seconds the pressure was released and the contents recovered. There was obtained a completely deboned, partially cooked, firm meat. The bones were removed. From the appearance of the meat, it could not be detected that it had been subjected to any unusual conditions.

*Example III*

Two turkey thighs and one chicken breast were loaded into a puffing gun and subjected to 100 p.s.i.g. steam for 4.5 minutes. The pressure was then reduced to 75 p.s.i.g. and maintained at that pressure for 0.5 minute. The pressure was then suddenly released and the contents recovered. There was no bone shattering and the meat was approximately 80% clear of bones. These bones were easily lifted out but the remaining 20% required somewhat greater force.

The foregoing examples have been included to illustrate various preferred embodiments of the invention and are not to be interpreted as limitations on the scope thereof. Many modifications will be apparent to those skilled in the art.

The process of the present invention is useful in deboning chicken, turkey, small game, and various other meats.

The embodiments of the present invention in which an exclusive property or privilege is claimed are defined as follows:

1. A process for deboning fowl which comprises subjecting said fowl to pressures in the range of 50 to 150 p.s.i. and temperatures in the range of 300 to 450° F. for a period of 10 to 600 seconds, suddenly releasing said pressure, thereby substantially separating the meat of said fowl from the bones of said fowl and removing said bones.

2. A process for deboning animal meat which comprises subjecting said meat containing bones to pressures in the range of 50 to 150 p.s.i. and temperatures in the range of 300 to 450° F. for a period of 10 to 600 seconds, suddenly releasing said pressure, thereby substantially separating the meat from the bones and removing the bones.

References Cited in the file of this patent
UNITED STATES PATENTS

| | | |
|---|---|---|
| 2,278,941 | Musher | Apr. 7, 1942 |
| 2,516,299 | Chiego | July 25, 1950 |